(12) United States Patent
Williams

(10) Patent No.: US 10,039,235 B2
(45) Date of Patent: Aug. 7, 2018

(54) MERGER AND MERGER ASSEMBLY WITH FIRST AND SECOND BELTS

(71) Applicant: KUHN NORTH AMERICA, INC., Brodhead, WI (US)

(72) Inventor: Dennis Williams, Albany, WI (US)

(73) Assignee: KUHN NORTH AMERICA, INC., Brodhead, WI (US)

( * ) Notice: Subject to any disclaimer, the term of this patent is extended or adjusted under 35 U.S.C. 154(b) by 0 days.

(21) Appl. No.: 15/137,715

(22) Filed: Apr. 25, 2016

(65) Prior Publication Data
US 2017/0303471 A1    Oct. 26, 2017

(51) Int. Cl.
| A01D 43/00 | (2006.01) |
| A01D 57/00 | (2006.01) |
| A01D 89/00 | (2006.01) |
| A01D 87/02 | (2006.01) |
| A01D 57/20 | (2006.01) |
| A01D 84/00 | (2006.01) |

(52) U.S. Cl.
CPC ........... *A01D 89/005* (2013.01); *A01D 57/20* (2013.01); *A01D 84/00* (2013.01); *A01D 87/02* (2013.01); *A01D 89/003* (2013.01)

(58) Field of Classification Search
CPC ...... A01D 57/20; A01D 80/005; A01D 84/00; A01D 57/28; A01D 89/001; Y10S 56/21
USPC ....................................................... 198/314
See application file for complete search history.

(56) References Cited

U.S. PATENT DOCUMENTS

| 2,195,381 | A | * | 3/1940 | Patterson | ............... | A01D 45/22 56/192 |
| 3,214,002 | A | * | 10/1965 | Kirkpatrick | ............ | A01D 57/20 198/369.7 |
| 4,429,517 | A | * | 2/1984 | Lohrentz | ............... | A01D 57/20 198/314 |
| 4,512,140 | A | * | 4/1985 | Blakeslee | ............... | A01D 57/20 56/11.4 |
| 4,519,190 | A | * | 5/1985 | Blakeslee | ............... | A01D 57/20 56/181 |
| 4,738,092 | A | | 4/1988 | Jennings | | |
| 4,905,466 | A | | 3/1990 | Heppner | | |
| 5,203,154 | A | | 4/1993 | Lesher et al. | | |
| 5,231,826 | A | * | 8/1993 | Jennings | ............... | A01D 57/20 56/10.9 |

(Continued)

OTHER PUBLICATIONS

Brochure, "Twin Mergers", H & S Manufacturing Co. Inc. 4 Pages total. (Apr. 2012).

(Continued)

*Primary Examiner* — Arpad Fabian-Kovacs
(74) *Attorney, Agent, or Firm* — Oblon, McClelland, Maier & Neustadt, L.L.P.

(57) ABSTRACT

A merger, for picking up and distributing materials from a ground surface, includes a frame that provides support to the merger, a pick-up head affixed to the frame that lifts the materials from the ground surface, a height adjustor affixed to the frame that maintains a minimum clearance between the ground surface and the pick-up head, and a conveyor affixed to the frame that receives the materials from the pick-up head. The conveyor includes a first belt and a second belt that independently distributes the materials on the ground surface from at least one of a first side of the frame and a second side of the frame.

16 Claims, 9 Drawing Sheets

(56) References Cited

U.S. PATENT DOCUMENTS

| | | | | |
|---|---|---|---|---|
| 5,272,860 | A * | 12/1993 | Baril | A01D 84/00 56/10.7 |
| 6,205,757 | B1 * | 3/2001 | Dow | A01D 57/20 56/366 |
| 6,212,865 | B1 | 4/2001 | Peeters et al. | |
| 6,401,440 | B1 * | 6/2002 | Franet | A01D 43/077 56/16.6 |
| 6,694,715 | B2 | 2/2004 | Schoenherr | |
| 6,715,274 | B2 | 4/2004 | Peeters et al. | |
| 7,310,929 | B2 | 12/2007 | Dow et al. | |
| 7,628,004 | B2 | 12/2009 | Geiser | |
| 7,827,774 | B2 | 11/2010 | Dow et al. | |
| 8,166,739 | B2 | 5/2012 | Dow et al. | |
| 8,186,138 | B2 | 5/2012 | Dow et al. | |
| 8,511,052 | B2 | 8/2013 | Dow et al. | |
| 8,863,488 | B2 | 10/2014 | Dow et al. | |
| 8,863,489 | B2 | 10/2014 | Landon et al. | |
| 8,919,088 | B2 | 12/2014 | Dow et al. | |
| 9,038,358 | B2 | 5/2015 | Landon et al. | |
| 9,295,189 | B2 | 3/2016 | Landon et al. | |
| 2004/0200203 | A1 * | 10/2004 | Dow | A01B 73/02 56/375 |
| 2006/0248870 | A1 * | 11/2006 | Geiser | A01D 84/00 56/344 |
| 2006/0254244 | A1 * | 11/2006 | Geiser | A01B 73/02 56/370 |
| 2010/0037584 | A1 * | 2/2010 | Dow | A01B 73/02 56/376 |
| 2012/0247078 | A1 * | 10/2012 | Landon | A01D 57/28 56/192 |

OTHER PUBLICATIONS

Brochure: "Tri-Flex Triple Head Mergers", H & S Manufacturing Co. Inc. 4 Pages total, (Dec. 2012).
Brochure. "Triple Mergers", OXBO, 4 Pages total.
Brochure, "Windrow Mergers", H & S Manufacturing Co. Inc., 6 Pages total, (Mar. 2012).
Brochure. "RT Series", ROC, 28 Pages total.
Brochure. "Mergers", OXBO, 4 Pages total.

* cited by examiner

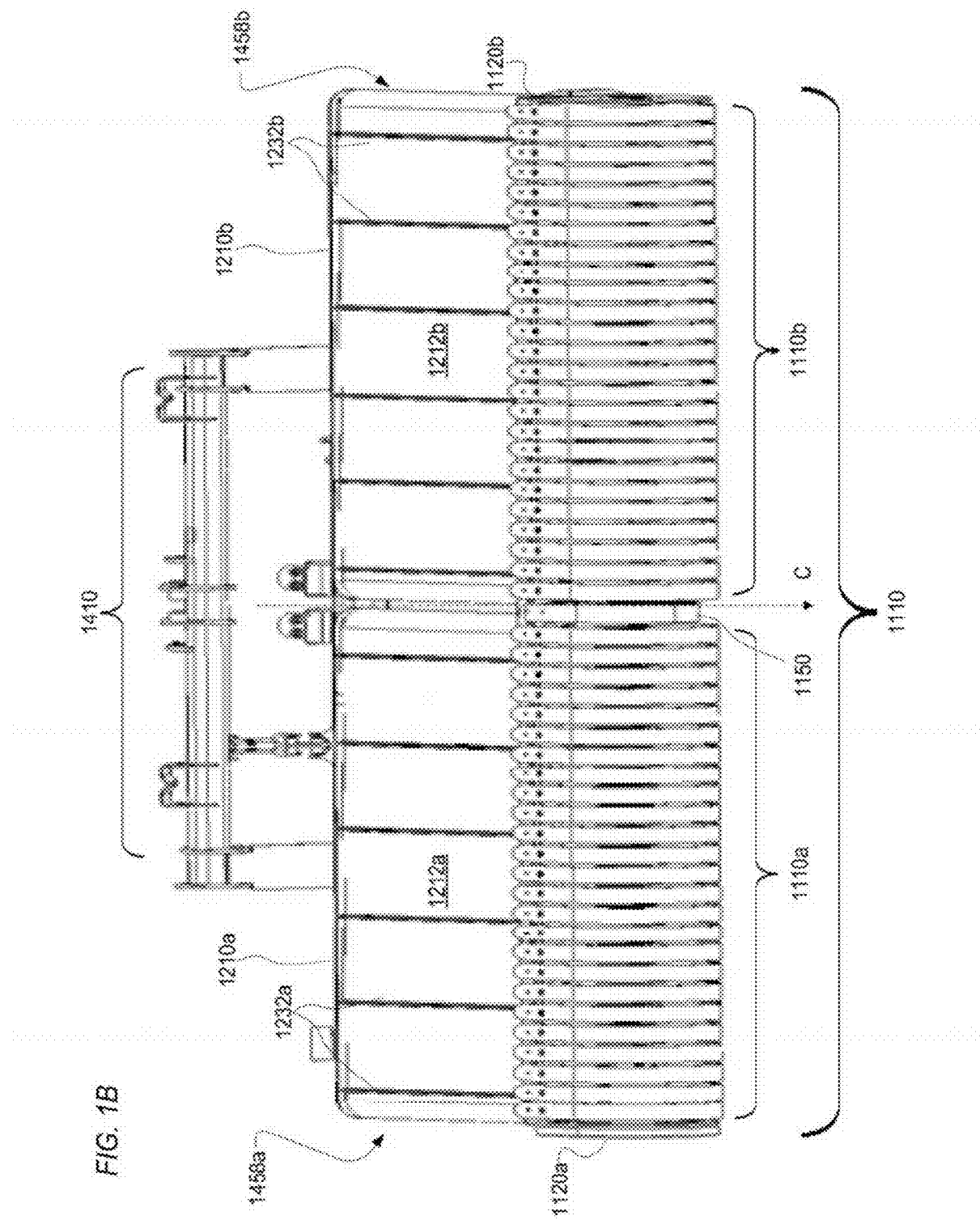

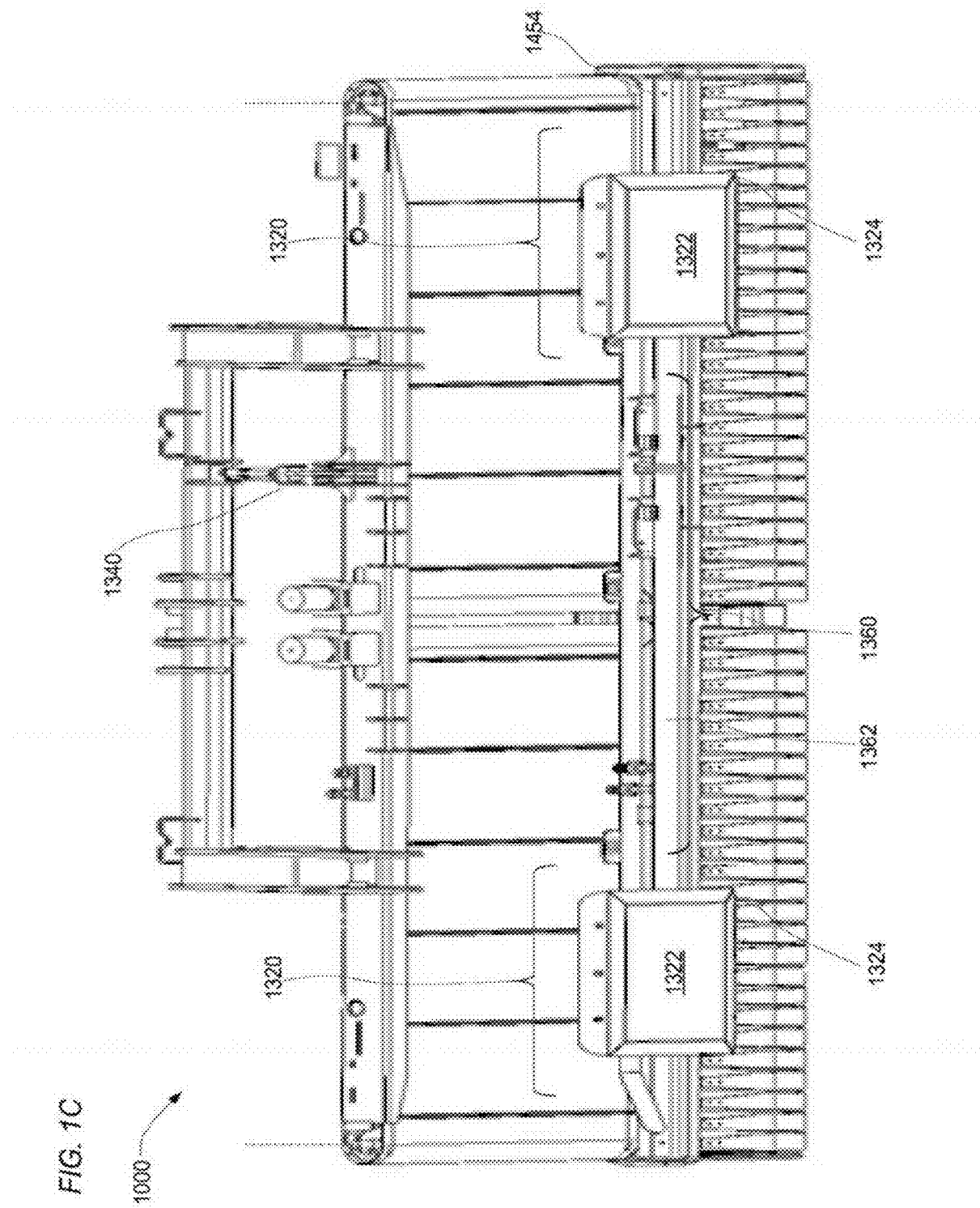

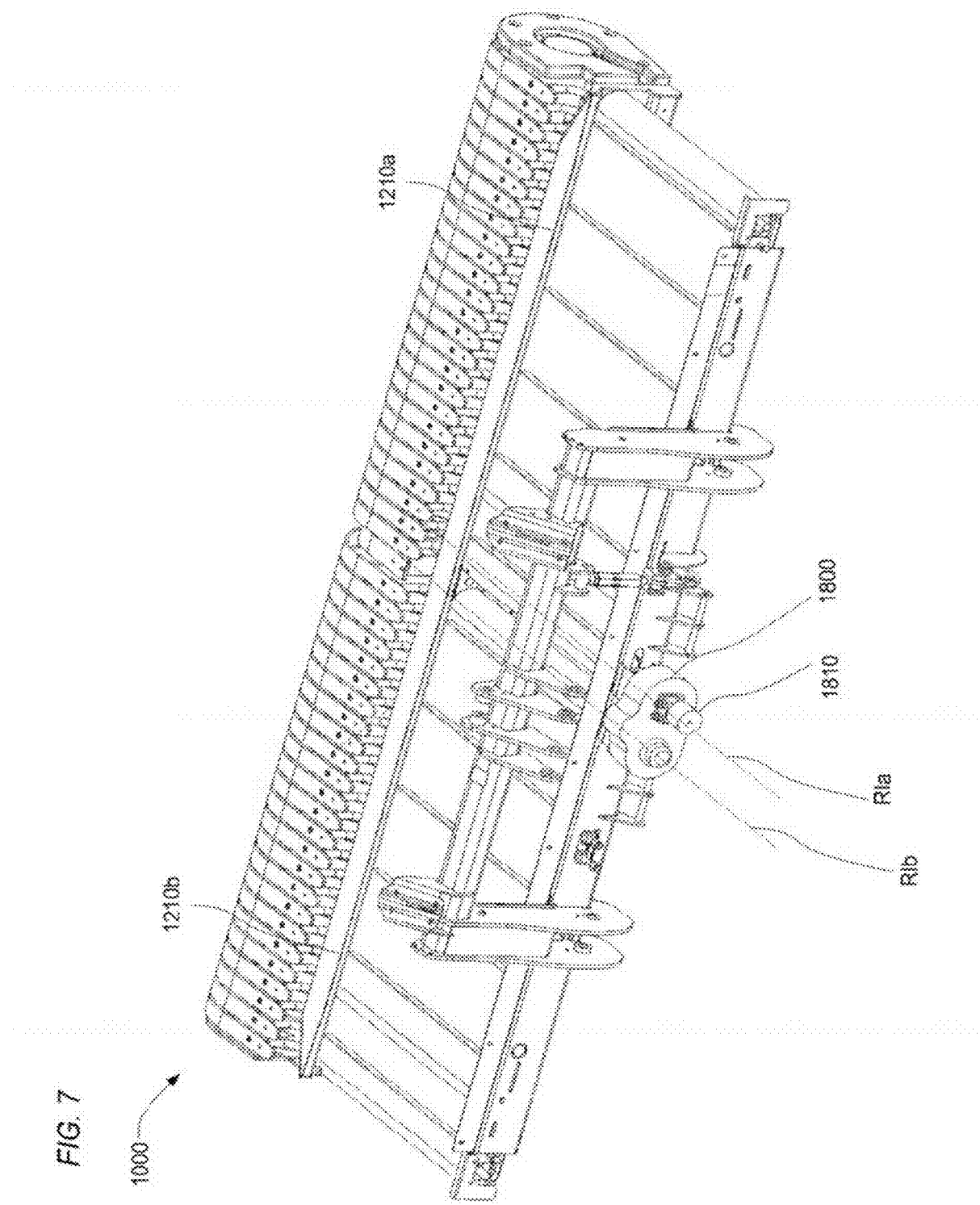

MERGER AND MERGER ASSEMBLY WITH FIRST AND SECOND BELTS

BACKGROUND

Field of the Disclosure

The present disclosure relates to agricultural equipment for harvesting. More precisely, the present application relates to mergers that may be used to pick up material, e.g., crops, from a ground surface, e.g., a field, and to distribute the material laterally to form at least one windrow on the ground surface that may later be collected.

Description of the Related Art

Picking up materials and distributing it to form windrows on a ground surface is a crucial part in harvesting. For this task, assemblies of several conventional mergers placed side by side are typically used. These conventional mergers are configured to collect and distribute the materials on one side only.

Although such assemblies of conventional mergers are widely used they present important drawbacks.

For example, some assemblies rely on an uneven number of conventional mergers placed side by side. Due to working width restriction, often three conventional mergers are placed side by side to form a triple merger 10, as illustrated in FIG. 6.

The triple merger 10 related to the present disclosure includes three conventional mergers connected side by side. Each merger of the triple merger 10 includes one single pick-up head 12 and a single conveyer 14 with a single belt 16 extending along the entire length of a single frame 18. The single pick-up head 12 collects the materials from the ground surface and transfers it to the single belt 16. The single belt 16 distributes the materials to the ground surface only from one side to form a single windrow. The triple merger 10 and consequently any merger assembly with an uneven number of conventional mergers can distribute all the materials on one side but cannot distribute half of the materials on one side and the other half of the materials on another side, i.e., even splitting.

Other assemblies can evenly split the materials by employing an even number of mergers. For example, some assemblies may rely on two conventional mergers working in concert, known as twin mergers. With these twin mergers, in order to achieve the same working width as a triple merger, the length of each conventional merger must be extended. Such an extended length that represents a rigid structure may be problematic in following the topology of the ground surface notably when an irregular terrain is encountered as it is often the case in agricultural activities. Conventional mergers with extended lengths may also encounter structural support and road transport issues, and consequently may increase the transportation and manufacturing costs.

Reducing the length of each conventional merger and increasing the even number of conventional mergers, e.g., from two mergers to four mergers, may improve the ability to follow the irregularity of the ground surface. However, such assemblies may increase the number of components, and consequently may increase the complexity, ease of use and cost.

Thus, mergers solving the aforementioned problems of adaptability, versatility, and difficulty of use are desired.

SUMMARY

Accordingly, the object of the present disclosure is to provide a merger and an assembly of mergers for evenly distributing the materials which overcome the above-mentioned limitations of adaptability, versatility, and ease of use.

The merger of the present disclosure ensures adaptability, versatility, and ease of use due to two independent distribution systems supported by the same compact structure. These two independent distribution systems correspond to a first belt supported by a first frame and driven by a first driving system and a second belt supported by a second frame and driven by a second driving system. The first and the second driving systems are configured to independently operate the first belt and the second belt, while the first and second frames are supported by a single main frame.

In one non-limiting illustrative example, a merger to pick up and to distribute materials from a ground surface is presented. The merger includes a frame that provides support to the merger; a pick-up head affixed to the frame that lifts the materials from the ground surface; and a conveyor affixed to the frame that receives the materials from the pick-up head. The conveyor includes a first belt and a second belt that independently distribute the materials on the ground surface from at least one of a first side of the frame and a second side of the frame.

In another non-limiting illustrative example, a merger to pick up and to distribute materials from a ground surface is presented. The merger includes a vertical frame assembly, and a horizontal frame assembly affixed that provides support to the merger, the horizontal frame assembly having a rear support member affixed to the vertical frame assembly, a front support member opposite to the rear support member, and cross members extending between the rear support member and the front support member, a pick-up head affixed to the front support member that lifts the materials from the ground surface, and a conveyor positioned on the cross members that receives the materials. The conveyor includes a first belt and a second belt that independently distribute the materials on the ground surface from a first side of the horizontal frame assembly, a second side of the horizontal frame assembly, or the combination thereof.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1B is a top view of the merger, according to certain aspects of the disclosure;

FIG. 1C is a bottom view of the merger, according to certain aspects of the disclosure;

FIG. 7 is a rear perspective view of the merger with a reverse mechanical drive, according to certain aspects of the disclosure.

DETAILED DESCRIPTION

Figure 1A:
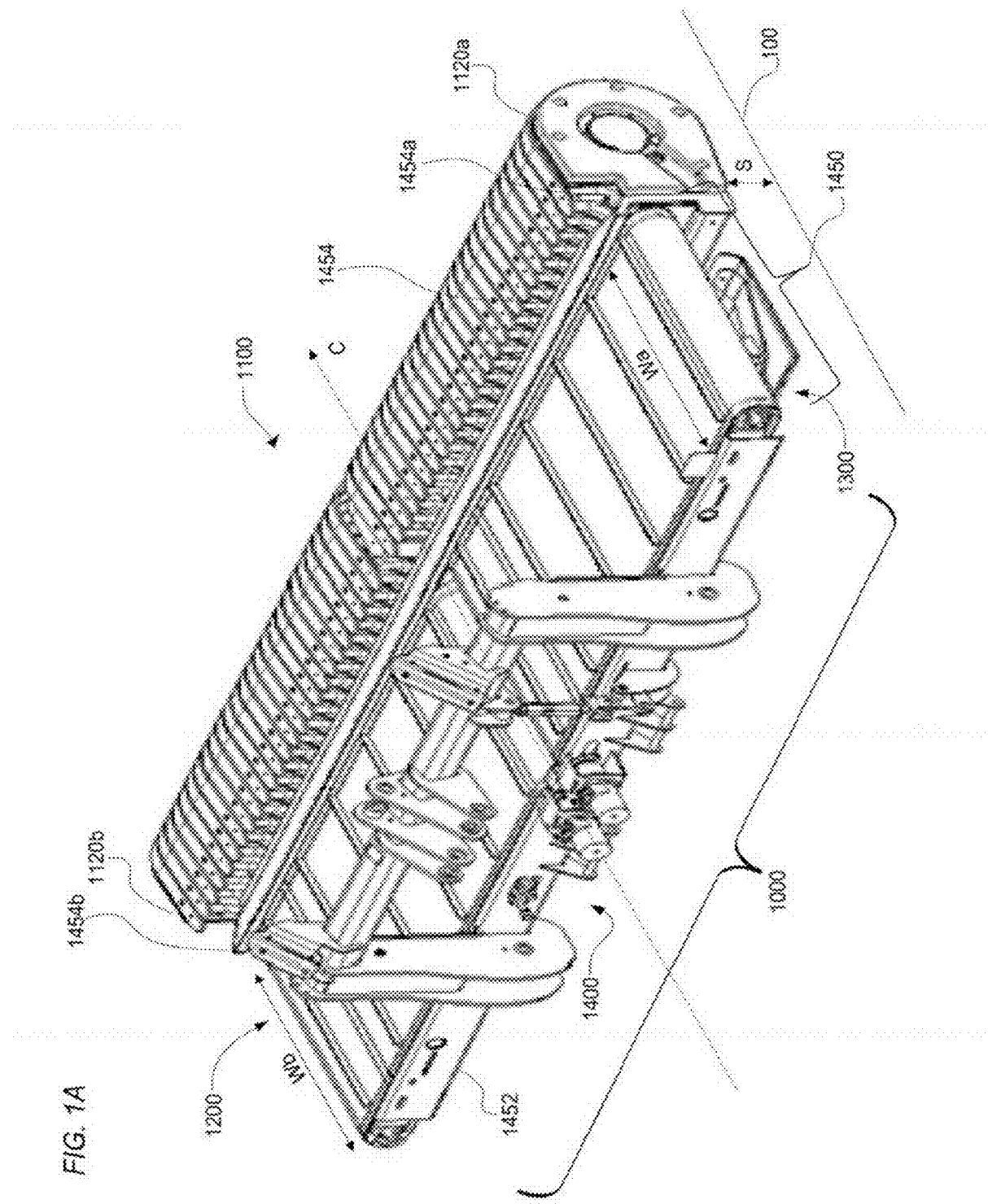
FIG. 1A is a rear perspective view of a merger, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

FIGS. 1A-1C are a rear perspective view, a top view, and a bottom view of a merger 1000, according to certain aspects of the disclosure.

The merger 1000 includes a pick-up head 1100, a conveyor 1200, a height adjuster 1300, and a frame 1400.

The frame 1400 supports the pick-up head 1100 and the conveyor 1200 while the height adjuster 1300 supports the frame 1400.

The height adjuster 1300 maintains the frame 1400, above a ground surface 100 of a field. The height adjuster 1300 is configured to maintain a minimum clearance (S) between the ground surface 100 and the pick-up head 1100.

The pick-up head 1100 lifts materials, such as crops, from the ground surface 100 and transfers the materials to the conveyor 1200 positioned behind the pick-up head 1100.

The conveyor 1200 then distributes the materials laterally to form at least one windrow on the ground surface 100 that can later be picked up.

The frame 1400 includes a horizontal frame assembly 1450 and a vertical frame assembly 1410 that may be affixed to a rear support member 1452 of the horizontal frame assembly 1450. The vertical frame assembly 1410 provides support to the horizontal frame assembly 1450 while the horizontal frame assembly 1450 provides support to the conveyor 1200 and the pick-up head 1100. The horizontal frame assembly 1450 extends between a first side 1458a and a second side 1458b of the horizontal frame assembly 1450. In addition, the vertical assembly 1410 may be configured to be engaged to a mode of transportation such as a trailer with wheels that may be towed by a vehicle via a tongue.

The pick-up head 1100 may be affixed on a front support member 1454 of the horizontal frame assembly 1450 and extends along a length of the horizontal frame assembly 1450. The front support member 1454 may be placed substantially parallel to the rear support member 1452 with cross members 1456 extending between the rear support member 1452 and the front support member 1454, see FIG. 2.

The pick-up head 1100 includes a series of guards 1110 extending between a first end plate 1120a and a second end plate 1120b. Each guard of the series of guards 1110 is placed vertically and spaced with an inter-guard distance between each other.

The first end plate 1120a and the second end plate 1120b may protrude from a first end 1454a of the front support member 1454 and from a second end 1454b of the front support member 1454, respectively. The first end plate 1120a and the second end plate 1120b may be substantially parallel and protrude in a rear to front direction, as illustrated by a central axis (C) of the horizontal frame 1450.

In addition, a series of pick-up teeth protruding radially from the pick-up head 1100 are positioned to alternate with each guard of the series of guards 1110. The series of pick-up teeth rotates to pick-up the materials and transfer the materials to the conveyor 1200 placed behind the pick-up head 1100.

As used herein, the term "front" refers to the region of the merger 1000 closest to the pick-up head 1100, the term "rear" refers to the region of the merger 1000 closest to the vertical frame assembly 1410, the term "first" refers to the region of the merger 1000 closest to the first side 1458a, and the term "second" refers to the region of the merger 1000 closest to the second side 1458b.

The conveyor 1200 includes a first belt 1210a and a second belt 1210b that may be placed side by side to extend along a length of the front support member 1454. The first belt 1210a provides a first conveying surface 1212a extending between the first side 1458a of the horizontal frame assembly 1450 and the central axis (C), while the second belt 1210b provides a second conveying surface 1212b extending between the central axis (C) and the second side 1458b of the horizontal frame assembly 1450. Both the first conveying surface 1212a and the second conveying surface 1212b extend between the rear support member 1452 and the front support member 1454 in the rear to front direction (C axis).

The first conveying surface 1212a of the first belt 1210a may include a first plurality of ridges 1232a to facilitate the transport of the materials. Each ridge of the first plurality of ridges 1232a may protrude from the first conveying surface 1212a of the first belt 1210a and extend along the width of the first belt 1210a in a direction that may be parallel to the central axis (C).

The second conveying surface 1212b of the second belt 1210b may include a second plurality of ridges 1232b to facilitate the transport of the materials. Each ridge of the second plurality of ridges 1232b may protrude from the second conveying surface 1212b of the second belt 1210b and extend along the width of the second belt 1210a in a direction that may be parallel to the central axis (C).

Both the first belt 1210a and the second belt 1210b may include one or more layers. For example, both the first 1210a and the second belt 1210b may include an under layer to provide linear strength and shape as well as an over layer covering the under layer. The under layer may be a woven fabric having a warp and weft made from polyester, nylon, cotton or a combination thereof. The cover layer may be made from rubber and/or plastic alloys.

Both the first belt 1210a and the second belt 1210b both receive the materials from the pick-up head 1100 and distribute the materials laterally on the ground surface 100. The first belt 1210a and the second belt 1210b can be operated independently and rely on a first driving system 1220a and a second driving system 1220b, respectively.

The first belt 1210*a*, the second belt 1210*b*, the first driving system 1220*a*, and the second driving system 1220*b* are supported by the horizontal frame assembly 1450 and may be positioned between the rear support member 1452 and the front rear member 1454.

The height adjustor 1300 includes at least one skid shoe 1320, a linear actuator 1340 and a linkage system 1360 connecting the at least one skid shoe 1320 to the linear actuator 1340.

The at least one skid shoe 1320 may be provided beneath the conveyor 1200 and the pick-up head 1100. The at least one skid shoe 1320 may include a flat portion 1322, similar as a flat plate, and angled lip portions 1324 on opposite sides of the flat portion 1322 in the rear to front direction (C axis).

During operation, t the at least one skid shoe 1320 and particularly the flat portion 1322 of the at least one skid shoe 1320 may contact the ground surface 100 to maintain the minimum clearance (S) between the ground surface 100 and the pick-up head 1100.

Under the action of the linear actuator 1340 the linkage system 1360 may be articulated to adjust the minimum clearance (S). The linkage system 1360 may include a pivot shaft 1362 connected to the at least one skid shoe 1320 and main linkage (not shown) connecting the pivot shaft 1362 to the linear actuator 1340. Under the action of the linear actuator 1340 the pivot shaft 1362 may be rotated in a first direction to push the at least one skid shoe 1320 against the ground surface 100 and increase the minimum clearance (S) and in a second direction to retract the at least one skid shoe 1320 against the horizontal frame assembly 1450 and decrease the clearance (S).

The linear actuator 1340 may be mechanical, hydraulic, electrical, or pneumatic. For example, the linear actuator 1340 may include a ball screw, a solenoid, hydraulic cylinder, pneumatic cylinder, or a combination thereof. Further, the linear actuator 1340 may be manually controlled or electronically controlled by a controller (not shown). The linear actuator 1340 may move in a vertical direction, and may be connected to the main linkage. The actuator is a linear applicator or a pivot, or a rotary actuator.

Figure 2:
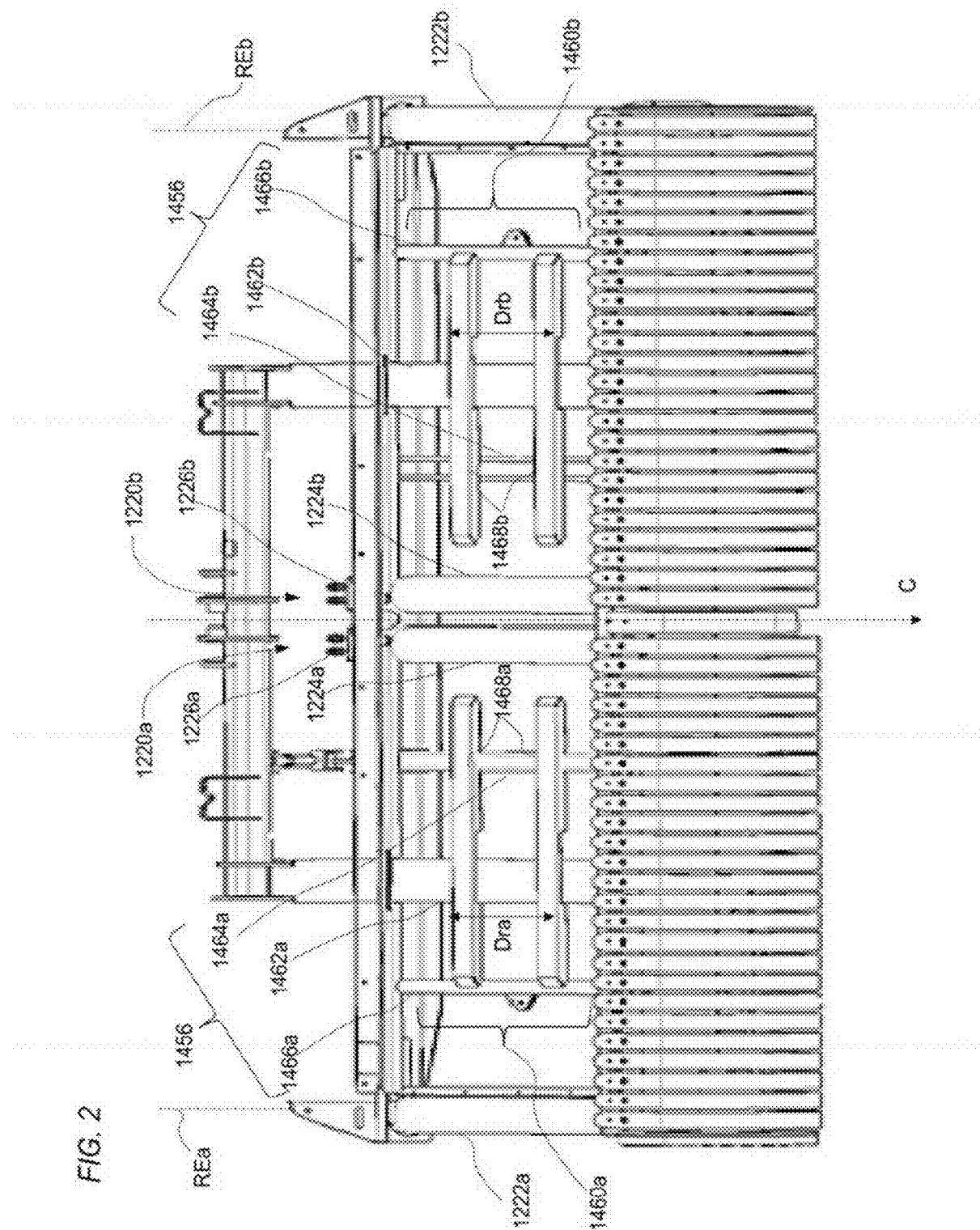
FIG. 2 is a top view of the merger without a first belt and a second belt, according to certain aspects of the disclosure.

FIG. 2 is a top view of the merger 1000 without the first belt 1210*a* and the second belt 1210*b*, according to certain aspects of the disclosure.

The first belt 1210*a* may be supported by a first conveyor frame 1460*a* that connects the rear support member 1452 and the front support member 1454, and that extends laterally between the first side 1458*a* of the horizontal frame assembly 1450 and the central axis (C).

The first conveyor frame 1460*a* includes a first central cross member 1462*a*, a first internal cross member 1464*a*, and a first external cross member 1466*a* extending between the rear support member 1452 and the front support member 1454. The first central cross member 1462*a*, the first internal cross member 1464*a*, and the first external cross member 1466*a* support a first pair of rails 1468*a* substantially parallel to the rear support member 1452. The first pair of rails 1468*a* is affixed on one side to the first external cross member 1466*a* and protrudes over the first internal cross member 1464*a* towards the central axis (C). The first pair of rails 1468*a* are separated by a first inter-rail distance (Dra) that may be smaller than a first width (Wa) of the first belt 1210*a*. A first internal surface of the first belt 1210*a* may ride on the first pair of rails 1468*a* to prevent the first belt 1210*a* from being deflected elongated and/or damaged by a weight of the materials deposed on the first conveying surface 1212*a* of the first belt 1210*a*.

Figure 3:
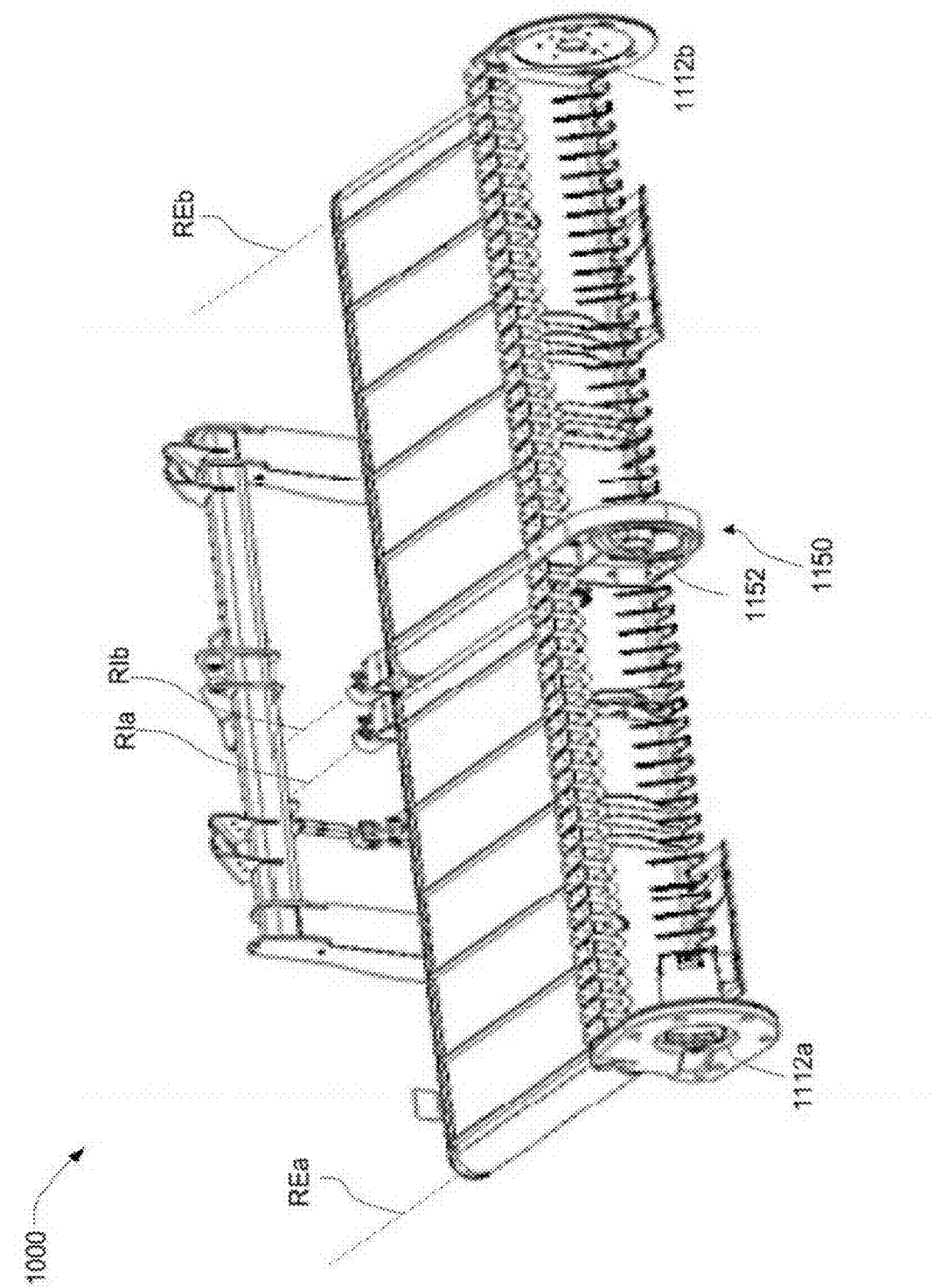
FIG. 3 is a front perspective view of the merger without a series of guards, according to certain aspect of the disclosure.

The first driving system 1220*a* includes a first passive roller 1222*a* freely rotatable around a first external axis (REa) and a first active roller 1224*a* rotatable via bias torque around a first internal axis (RIa), see FIG. 3, wherein the first external axis (REa) and the first internal axis (RIa) may be included on a common horizontal plane. The first external axis (REa) may be placed substantially close to the first side 1458*a* of the horizontal frame assembly 1450 while the first internal axis (RIa) may be placed substantially close to the central axis (C).

The first passive roller 1222*a* and the first active roller 1224*a* may extend between the rear support member 1452 and the front support member 1454.

The first active roller 1224*a* is in contact with an internal surface of the first belt 1210*a* and drives the first belt 1210*a* while the first passive roller 1222*a* provides support and tension to the first belt 1210*a*. The first active roller 1224*a* includes a first drive mount 1226*a* in order to provide a torque around the first internal axis (RIa) and rotate the first active roller 1224*a*. The rotation of the first active roller 1224*a* drives the first belt 1210*a* by contact friction between the first active roller 1224*a* and the internal surface of the first belt 1210*a*. The first drive mount 1226*a* may be connected on to a rear of the rear support member 1452 in a location corresponding to the first active roller 1224*a* and the first internal axis (RIa).

The first drive mount 1226*a* may be powered hydraulically, pneumatically, electrically or mechanically via a power takeoff. For example, the first drive mount 1226*a* may include an electrical motor, a hydraulic motor, a gear box, a rotatory actuator or the combination thereof. Further, the first drive mount 1226*a* may be manually controlled by a user or automatically controlled by a controller.

The second conveyor frame 1460*b* includes a second central cross member 1462*b*, a second internal cross member 1464*b*, and a second external cross member 1466*b* extending between the rear support member 1452 and the front support member 1454. The second central cross member 1462*b*, the second internal cross member 1464*b*, and the second external cross member 1466*b* support a second pair of rails 1468*b* substantially parallel to the rear support member 1452. The second pair of rails 1468*b* is affixed on one side to the second external cross member 1466*b* and protrudes over the second internal cross member 1464*b* towards the central axis (C). The second pair of rails 1468*b* are separated by a second inter-rail distance (Drb) that may be smaller than a second width (Wb) of the second belt 1210*b*. A second internal surface of the second belt 1210*b* may ride on the second pair of rails 1468*b* to prevent the second belt 1210*b* from being deflected elongated and/or damaged by a weight of the materials deposed on the second conveying surface 1212*b* of the second belt 1210*b*.

As with the first belt 1210*a*, the second belt 1210*b* may be supported by a second conveyor frame 1460*b* that connects the rear support member 1452 and the front support member 1454, and that extends laterally between the second side 1458*b* of the horizontal frame assembly 1450 and the central axis (C).

As with the first driving system 1220*a*, the second driving system 1220*b* includes a second passive roller 1222*b* freely rotatable around a second external axis (REb) and a second active roller 1224*b* rotatable via bias torque around a second internal axis (RIb), see FIG. 3, wherein the second external axis (REb) and the second internal axis (RIb) may be included on a common horizontal plane. The second external axis (REb) may be placed substantially close to the second side 1458*b* of the horizontal frame assembly 1450 while the second internal axis (RIb) may be placed substantially close to the central axis (C).

The second passive roller 1222*b* and the second active roller 1224*b* may extend between the rear support member 1452 and the front support member 1454.

The second active roller 1224*b* is in contact with an internal surface of the second belt 1210*b* and drives the second belt 1210*b* while the second passive roller 1222*b* provides support and tension to the second belt 1210*b*. The second active roller 1224*b* includes a second drive mount 1226*b* in order to provide a torque around the second internal axis (RIb) and rotate the second active roller 1224*b*. The rotation of the second active roller 1224*b* drives the second belt 1210*b* by contact friction between the second active roller 1224*b* and the internal surface of the second belt 1210*b*. The second drive mount 1226*b* may be connected on to a rear of the rear support member 1452 in a location corresponding to the second active roller 1224*b* and the second internal axis (RIb).

As with the first drive mount 1226*a*, the second drive mount 1226*b* may be powered hydraulically, pneumatically, electrically or mechanically via a power takeoff. For example, the second drive mount 1226*b* may include an electrical motor, a hydraulic motor, a gear box, a rotatory actuator or the combination thereof. Further, the second drive mount 1226*b* may be manually controlled by a user or automatically controlled by a controller.

The first driving system 1220*a* and the second driving system 1220*b* may be configured to be operated independently in order for the first belt 1210*a* and the second belt 1210*b* to be driven in different directions and/or at different speeds.

Operating the first belt 1210*a* and the second belt 1210*b* independently provides to the merger 1000 the capability to have different mode of operations and to distribute the materials in different fashions.

In a first exemplary mode of operation of the merger 1000, the first driving system 1220*a* and the second driving system 1220*b* may drive the first belt 1210*a* and the second belt 1210*b* in a clockwise co-rotating fashion to distribute the materials only on the first side 1458*a* of the horizontal frame assembly 1450.

In a second exemplary mode of operation of the merger 1000, the first driving system 1220*a* and the second driving system 1220*b* may drive the first belt 1210*a* and the second belt 1210*b* in a counter-clockwise co-rotating fashion to distribute the materials only the second side 1458*b* of the horizontal frame assembly 1450.

In a third exemplary mode of operation of the merger 1000, the first driving system 1220*a* and the second driving system 1220*b* may drive the first belt 1210*a* and the second belt 1210*b* in a contra-rotating fashion to distribute the materials on the first side and the second side of the merger 1000. In addition, the first belt 1210*a* and the second belt 1210*b* may each have different rotational speed to distribute different quantities of the materials on the first side 1458*a* and the second side 1458*b* of the horizontal frame assembly 1450.

FIG. 3 is a front perspective view of the merger 1000 without the series of guards 1110, according to certain aspect of the disclosure.

The series of guards 1110 may be split into a first series of guard 1110*a* and a second series of guards 1110*b* and connected via a central guard assembly 1150.

The first belt 1210*a* may be placed behind the first series of guards 1110*a* and extend longitudinally along the first series of guards 1110*a* to receive the materials from the pick-up teeth associated with the first series of guards 1110*a* while the second belt 1210*b* may be placed behind the second series of guards 1110*b* and extend longitudinally along the second series of guards 1110*b* to receive the materials from the pick-up teeth associated with the second series of guards 1110*b*.

The central guard assembly 1150 protrudes from the front support member 1454 and is aligned with the central axis (C) between the first series of guards 1110*a* and the second series of guards 1110*b*.

Figure 4:
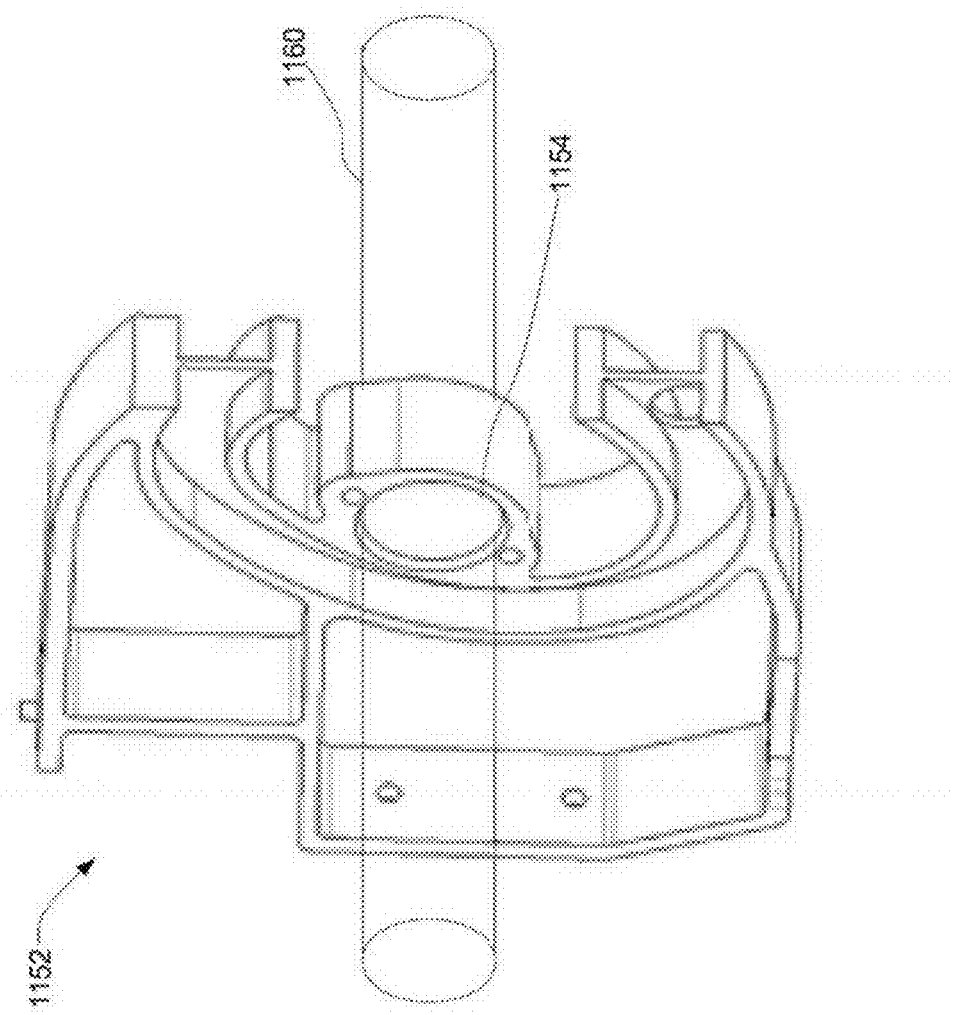
FIG. 4 is a cross-sectional view of a center cam of the merger, according to certain aspect of the disclosure.

FIG. 4 is a sectional view of a center cam 1152 of the central guard assembly 1150, according to certain aspect of the disclosure.

The central guard assembly 1150 may include a central cam 1152 to support at least one drive shaft 1160 that provides the rotational motion of the pick-up teeth. The at least one drive shaft 1160 may be inserted into a central orifice 1154 of the central cam 1152, a first orifice 1112*a* of the first end plate 1120*a*, and/or a second orifice 1112*b* of the second end plate 1110*b*.

The central orifice 1154 may support one shaft extending from the first orifice 1112*a* to the second orifice 1112*b*. Alternatively, the central orifice 1154 may support a first shaft, extending from the first orifice 1112*a* to a first side of the central orifice 1154, and a second shaft, extending from a second side of the central orifice 1154 to the second orifice 1112*b*, see FIG. 3.

The rotational motion of the series of pick-up teeth is exerted by the at least one drive shaft 1160 that may be supported by the first end plate 1120*a* and/or the second end plate 1120*b* and/or the central cam 1152 of the central guard assembly 1150.

Figure 5:
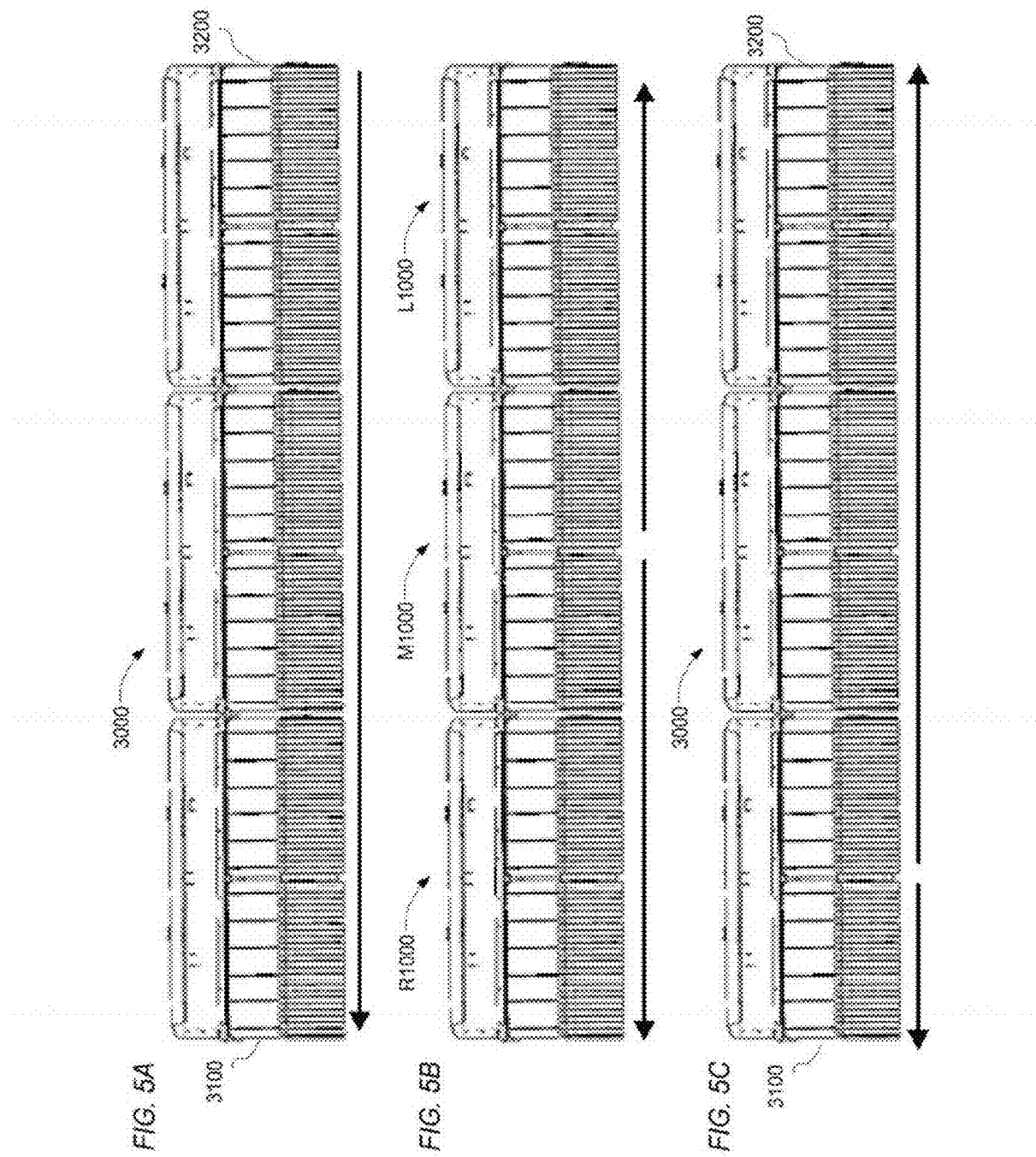
FIG. 5A is top view of a merger assembly in a first exemplary configuration, according to certain aspect of the disclosure.
FIG. 5B is top view of the merger assembly in a second exemplary configuration, according to certain aspect of the disclosure.
FIG. 5C is top view of the merger assembly in a third exemplary configuration, according to certain aspect of the disclosure.
Figure 6:
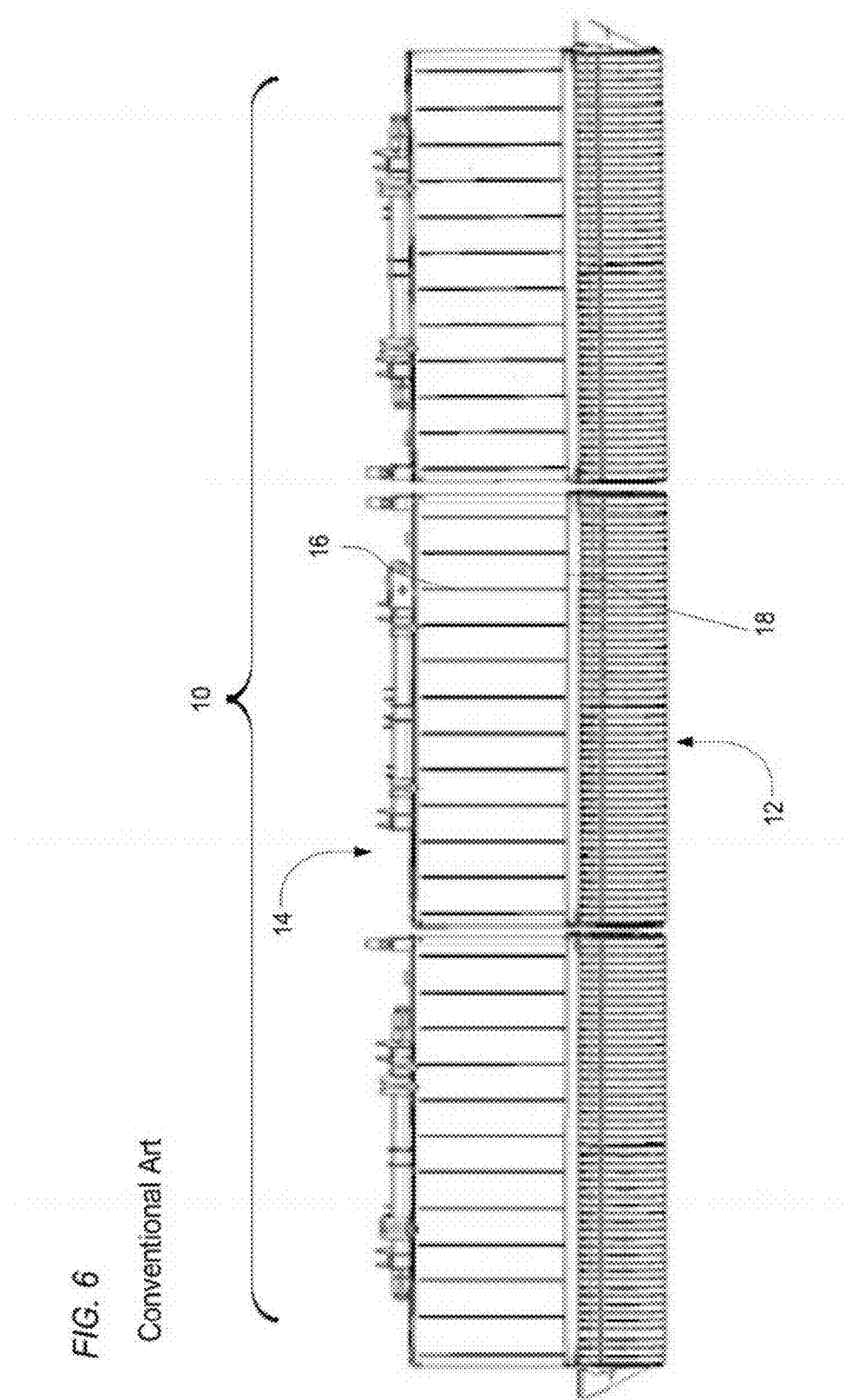
FIG. 6 is a top view of a conventional merger assembly.

FIGS. 5A-5C are top views of a merger assembly 3000 in a first exemplary configuration, in a second exemplary configuration, in a third exemplary configuration, respectively and according to certain aspect of the disclosure.

The merger assembly 3000 may include a plurality of mergers 1000 placed side by side and moveably connected to each other. The merger assembly 3000 provides a wide structure processing more materials, a flexible structure following more precisely a topology of the ground surface 100, and configurable structure moving the materials via different configurations.

For example and as illustrated in FIG. 5A-5C, the merger assembly 3000 may include a right merger R1000, a middle merger M1000, and a left merger L1000 that may be connected side by side. The right merger R1000, the middle merger M1000 and the left merger L1000 may be each similar to the merger 1000 and may each be operated with different modes of operation. The right merger R1000, the middle merger M1000, and the left merger L1000 may be configured to provide at least three different configurations for the merger assembly 3000.

In the first exemplary configuration, all belts of the right merger R1000, the middle merger M1000, and the left merger L1000 may be driven in the same direction, e.g., a counter-clockwise direction, to distribute the materials only on a first side 3100 of the merger assembly 3000, as illustrated by the arrow in FIG. 5A.

In the second exemplary configuration, a first half of the belts of the merger assembly 3000 may be driven in a counter-clockwise direction while a second half of the belts may be driven in a clockwise direction, as illustrated by the arrows in FIG. 5B.

In this second exemplary configuration 50% of the materials would be distributed on the first side 3100 of the merger assembly 3000 and 50% of the materials would be distributed on a second side 3200 of the merger assembly 3000.

In the third exemplary configuration, a first number of belts is driven in a counter clockwise direction while a second number of belts, different form the first number of belts, is driven in a clockwise direction to distribute different quantities of materials on each side of the merger assembly 3000. For example, 1 belt out of 6 may be driven in a counter-clockwise direction to distribute 17% of the materials on the first side 3100 of the merger assembly 3000 while 5 belts out of 6 belts may be driven in a clockwise direction to distribute 83% of the materials on the second side 3200 of the merger assembly 3000, as illustrated in FIG. 5C.

In addition, the belts may rotate at different speeds to distribute different quantities of materials on each side.

Other configurations may be possible, for example a first external belt facing the first side 3100 and a second external belt facing the second side 3200 may contra rotate towards the middle merger M1000, while the other belts may rotate to push the material towards the first side 3100 and the second side 3200. Such configuration may be useful to clear up the merger assembly 3000 from unwanted residues of the materials.

FIG. 7 is a rear perspective view of the merger 1000 with a reverse mechanical drive 1800, according to certain aspects of the disclosure.

In certain aspect of the present disclosure, the merger 1000 may include a reversible mechanical drive 1800 configured to drive the first belt 1210a and the second belt 1210b with selectable directions and speeds. For example, the reversible mechanical drive 1800 may be operated to drive the first belt 1210a at a first selected speed in a first selected direction, e.g., clockwise or counter-clockwise direction, and to drive the second belt 1210b at a second selected speed in a second selected direction, e.g., clockwise or counter-clockwise direction.

The reversible mechanical drive 1800 may include an input drive mount 1810 connected to the first driving system 1220a and the second driving system 1220b via gear trains, chains, sprockets, differentials or the like, to provide a first torque around the first internal axis (RIa) to rotate the first active roller 1224a and a second torque around the second internal axis (RIb) to rotate the second active roller 1224b.

In addition, the reversible mechanical drive 1800 may include an actuator to select the first selected speed, the second selected speed, the first selected direction, the second selected direction, or combination thereof.

The actuator may be mechanical, hydraulic, electrical, or pneumatic. For example, the actuator may include a lever, a cable, a solenoid, hydraulic cylinder, pneumatic cylinder, or a combination thereof. Further, the actuator may be manually controlled or electronically controlled by a controller (not shown).

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A merger to pick up and to distribute materials from a ground surface, comprising:
   a frame that is rigid, the frame having:
      a first lateral portion,
      a second lateral portion,
      a central portion positioned between the first lateral portion and the second lateral portion, and
      a front rigid member extending between the first lateral portion and the second lateral portion;
   a pick-up head affixed to the frame and extending between the first lateral portion of the frame and the second lateral portion of the frame that lifts the materials from the ground surface; and
   a conveyor affixed along the frame and extending between the first lateral portion of the frame and the second lateral portion of the frame that receives the materials from the pick-up head, the conveyor including:
      a first driving system extending between the first lateral portion of the frame and the central portion of the frame, and including a first roller and a first active roller, and a first belt extending between the first roller and the first active roller and driven by at least one of the first roller and the first active roller,
      a second driving system extending between the central portion of the frame and the second lateral portion of the frame, and including a second roller and a second active roller, and a second belt extending between the second roller and the second active roller and driven by at least one of the second roller and the second active roller, wherein
   one of the first roller and the first active roller is positioned on the first lateral portion of the frame and the other of the first roller and the first active roller is positioned on the central portion of the frame,
   one of the second roller and the second active roller is positioned on the second lateral portion of the frame and the other of the second roller and the second active roller is positioned on the central portion of the frame,
   the first driving system and the second driving system operate independently of each other,
   in a first operating mode, the first driving system and second driving system respectively drive the first belt and the second belt so as to be co-rotating to collect and distribute the materials towards either the first lateral portion or the second lateral portion, and
   in a second operating mode, first driving system and second driving system respectively drive the first belt and the second belt so as to be contra-rotating to split the materials and distribute the materials towards both the first lateral portion and the second lateral portion.

2. The merger as claimed in claim 1, wherein the first belt is supported by a first conveyor frame placed between the first lateral portion of the frame and the central portion of the frame and the second belt is supported by a second conveyor frame placed between the second lateral portion of the frame and the central portion of the frame.

3. The merger as claimed in claim 2, wherein the first conveyor frame includes a first pair of rails that supports the first belt and the second conveyor frame includes a second pair of rails that supports the second belt.

4. The merger as claimed in claim 1, wherein the pick-up head includes a series of guards extending between a first end plate and a second end plate to guide a series of pick-up teeth, the first end plate protruding along the first lateral portion of the frame and the second end plate protruding along the second lateral portion of the frame.

5. The merger as claimed in claim 4, wherein the series of guards is separated by a central guard assembly to form a first series of guards laterally aligned with the first belt and a second series of guards laterally aligned with the second belt.

6. The merger as claimed in claim 5, wherein the central guard assembly includes a central cam which supports the first end plate and the second end plate at least one drive shaft that provides a rotational motion of the pick-up teeth.

7. The merger as claimed in claim 1, further comprising a height adjustor affixed to the frame that maintains a minimum clearance between the ground surface and the pick-up head, wherein the height adjustor includes at least one skid shoe positioned below at least one of the pick-up head and the conveyor such that the at least one skid shoe contacts the ground surface.

8. The merger as claimed in claim 7, wherein the height adjustor further comprises:
a linkage system that connects the at least one skid shoe and the frame, and
a linear actuator that actuates the linkage to adjust the minimum clearance between the ground surface and the pick-up head.

9. A merger to pick up and to distribute materials from a ground surface, comprising:
a vertical frame assembly;
a horizontal frame assembly including:
a first lateral portion,
a second lateral portion,
a central portion positioned between the first lateral portion and the second lateral portion,
a rear support member that is rigid, affixed to the vertical frame assembly, and extends between the first lateral portion and the second lateral portion,
a front support member opposite to the rear support member, and
cross members extending between the rear support member and the front support member;
a pick-up head affixed along the front support member and extending between the first lateral portion of the horizontal frame assembly and the second lateral portion of the horizontal frame assembly that lifts the materials from the ground surface; and
a conveyor positioned on the cross members and extending between the first lateral portion of the horizontal frame assembly and the second lateral portion of the horizontal frame assembly that receives the materials, the conveyor including:
a first driving system extending between the first lateral portion of the horizontal frame assembly and the central portion of the horizontal frame assembly, and including a first roller and a first active roller,
a first belt extending between the first roller and the first active roller and driven by at least one of the first roller and the first active roller,
a second driving system extending between the central portion of the horizontal frame assembly and the second lateral portion of the horizontal frame assembly, and including a second roller and a second active roller, and
a second belt extending between the second roller and the second active roller and driven by at least one of the second roller and the second active roller, wherein
one of the first roller and the first active roller is positioned on the first lateral portion of the horizontal frame assembly and the other of the first roller and the first active roller is positioned on a central portion of the horizontal frame assembly,
one of the second roller and the second active roller is positioned on the second lateral portion of the horizontal frame assembly and the other of the second roller and the second active roller is positioned on the central portion of the horizontal frame assembly,
the first driving system and the second driving system operate independently of each other,
in a first operating mode, the first driving system and second driving system respectively drive the first belt and the second belt so as to be co-rotating to collect the materials and distribute the materials towards either the first lateral portion or the second lateral portion, and
in a second operating mode, the first driving system and the second driving system respectively drive the first belt and the second belt so as to be contra-rotating to split the materials and distribute the materials towards both the first lateral portion and the second lateral portion.

10. The merger as claimed in claim 9, wherein the first belt is supported by a first conveyor frame placed between the first lateral portion of the horizontal frame assembly and the central portion of the horizontal frame assembly and the second belt is supported by a second conveyor frame placed between the second lateral portion of the horizontal frame assembly and the central portion of the horizontal frame assembly.

11. The merger as claimed in claim 10, wherein the first conveyor frame includes a first pair of rails affixed to the cross members that supports the first belt and the second conveyor frame includes a second pair of rails affixed to the cross members that supports the second belt.

12. The merger as claimed in claim 9, wherein the pick-up head includes a series of guards extending between a first end plate and a second end plate to guide a series of pick-up teeth, the first end plate protruding along the first lateral portion of the horizontal frame assembly from a first end of the front support member and the second end plate protruding along the second lateral portion of the horizontal frame assembly from a second end of the front support.

13. The merger as claimed in claim 12, wherein the series of guards is separated by a central guard assembly to form a first series of guards laterally aligned with the first belt and a second series of guards laterally aligned with the second belt.

14. The merger as claimed in claim 13, wherein the central guard assembly includes a central cam which supports the first end plate and the second end plate at least one drive shaft that provides a rotational motion of the pick-up teeth.

15. The merger as claimed in claim 9, further comprising a height adjustor affixed to the horizontal frame assembly that maintains a minimum clearance between the ground surface and the pick-up head, wherein the height adjustor includes at least one skid shoe positioned below at least one of the pick-up head and the conveyor such that the at least one skid shoe contacts the ground surface.

16. The merger as claimed in claim 9, further comprising a reversible mechanical drive which drives the first belt at a first selected speed in a first selected direction; and to drive the second belt at a second selected speed in a second selected direction.

* * * * *